United States Patent
Han et al.

(10) Patent No.: US 10,031,560 B2
(45) Date of Patent: Jul. 24, 2018

(54) WINDOW SUBSTRATE AND DISPLAY APPARATUS INCLUDING THE SAME

(71) Applicant: SAMSUNG DISPLAY CO., LTD., Yongin-si, Gyeonggi-do (KR)

(72) Inventors: Sangwoo Han, Cheonan-si (KR); Min-a Kim, Cheongju-si (KR); Dongho Lee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 159 days.

(21) Appl. No.: 15/229,068

(22) Filed: Aug. 4, 2016

(65) Prior Publication Data

US 2017/0147040 A1    May 25, 2017

(30) Foreign Application Priority Data

Nov. 20, 2015    (KR) ........................ 10-2015-0163482

(51) Int. Cl.
*B32B 3/02* (2006.01)
*G06F 1/18* (2006.01)
*G06F 1/16* (2006.01)

(52) U.S. Cl.
CPC .............. *G06F 1/18* (2013.01); *G06F 1/1626* (2013.01); *G06F 1/1656* (2013.01)

(58) Field of Classification Search
CPC .......... G06F 1/18; G06F 1/182; G06F 1/1626; G06F 1/1656
See application file for complete search history.

(56) References Cited

FOREIGN PATENT DOCUMENTS

| KR | 10-2005-0098578 A | 10/2005 |
|---|---|---|
| KR | 10-0597189 B1 | 7/2006 |
| KR | 10-1212345 B1 | 12/2012 |
| KR | 10-2013-0006160 A | 1/2013 |
| KR | 10-1457698 B1 | 11/2014 |
| KR | 10-2015-0024355 A | 3/2015 |

*Primary Examiner* — Elizabeth E Mulvaney
(74) *Attorney, Agent, or Firm* — Lewis Roca Rothgerber Christie LLP

(57) ABSTRACT

A display apparatus includes a display panel for displaying an image, and a window substrate covering the display panel, the window substrate including a base substrate having a display area and a non-display area, a first printing layer at the base substrate, corresponding to the non-display area, and defining a logo hole, a logo pattern at the first printing layer and corresponding to the non-display area, a portion of the logo pattern being exposed through the logo hole, and a second printing layer at the logo pattern and spaced from the first printing layer with the logo pattern therebetween.

20 Claims, 16 Drawing Sheets

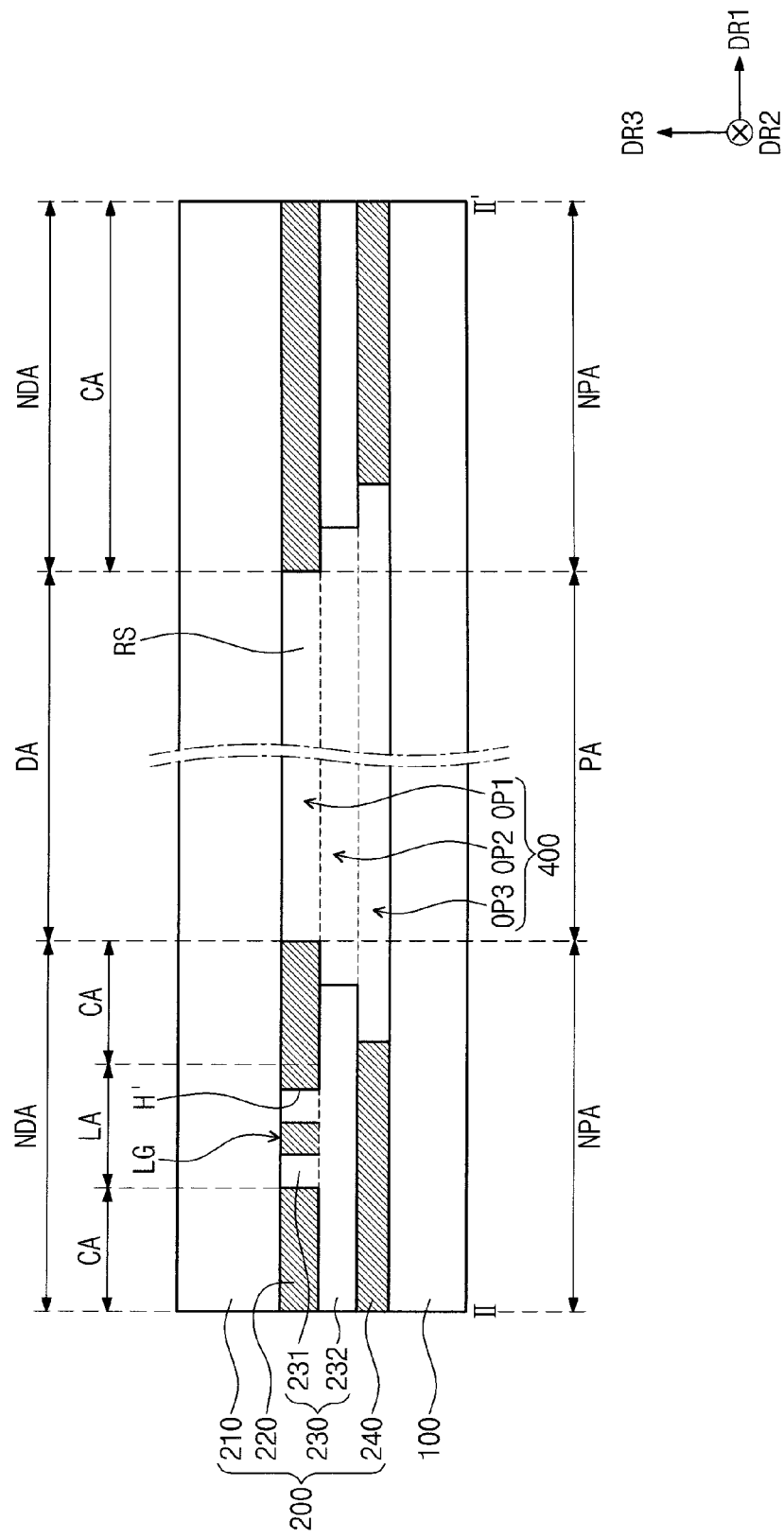

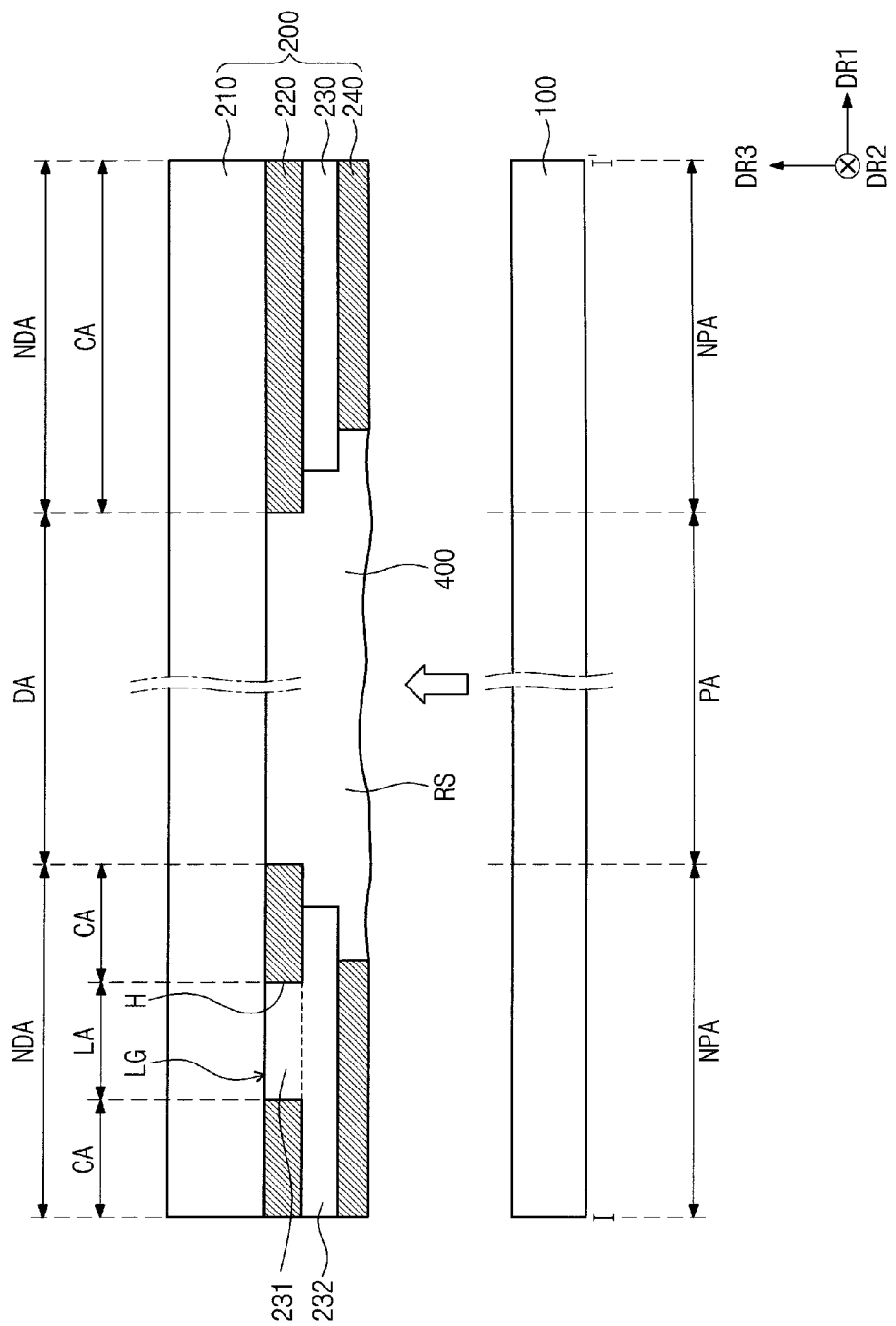

WINDOW SUBSTRATE AND DISPLAY APPARATUS INCLUDING THE SAME

CROSS-REFERENCE TO RELATED APPLICATION

This application claims priority to, and the benefit of, Korean Patent Application No. 10-2015-0163482, filed on Nov. 20, 2015, in the Korean Intellectual Property Office, the disclosure of which is incorporated herein in its entirety by reference.

BACKGROUND

1. Field

Embodiments of the present invention provide a window substrate with improved yield, and a display apparatus including the window substrate.

2. Description of the Related Art

Electronic apparatuses, such as mobile communication terminals, digital cameras, laptops, monitors, televisions, and the like, include a display apparatus for displaying an image.

The display apparatus may include a display panel configured to generate and display images, and a window panel located on the display panel to protect the display panel. Various display apparatuses, such as a liquid crystal display (LCD), an organic light emitting display (OLED), an electro wetting display device (EWD), an electrophoretic display device (EPD), and the like, have been developed as display panels. The display panel may have a built-in touch function.

The window panel may be attached to an upper surface of the display panel. An image generated from the display panel may be provided to a viewer through the window panel. The window panel may be designed in various colors.

SUMMARY

The present disclosure provides a window substrate with improved yield, and a display apparatus including the same.

According to one or more embodiments, a display apparatus includes a display panel for displaying an image, and a window substrate covering the display panel, the window substrate including a base substrate having a display area and a non-display area, a first printing layer at the base substrate, corresponding to the non-display area, and defining a logo hole, a logo pattern at the first printing layer and corresponding to the non-display area, a portion of the logo pattern being exposed through the logo hole, and a second printing layer at the logo pattern and spaced from the first printing layer with the logo pattern therebetween.

The resin layer may be located between the display panel and the window substrate, and may contact the first printing layer, the second printing layer, and the logo pattern, and reactivity between the logo pattern and the resin layer may be less than reactivity between the resin layer and each of the first and second printing layers.

The first and second printing layers may include a first pigment and a polymer resin, the logo pattern may include a second pigment and a polymer resin, and a content ratio of the first pigment to the polymer resin in each of the first and second printing layers may be smaller than a content ratio of the second pigment to the polymer resin in the logo pattern.

The first pigment may include a material that is different from the second pigment.

The second pigment may include a metallic material.

The first printing layer may include a multilayer structure.

The second printing layer may be fully overlapped by the logo pattern when viewed in a plane.

The third printing layer may be at the second printing layer, such that the second printing layer is between the third printing layer and the logo pattern, and the third printing layer may include a same material as the logo pattern.

The logo pattern may include a first logo layer in the logo hole and exposed on the base substrate, and a second logo layer between the first and second printing layers.

The first logo layer and the second logo layer may include an integrally connected structure.

The first and second logo layers may include different shapes, and the first printing layer may be between portions of the first logo layer.

The first and second printing layers may include a first pigment, the logo pattern may include a second pigment, and a content ratio of the first pigment to a remainder of each of the first and second printing layers may be smaller than a content ratio of the second pigment to a remainder of the logo pattern.

The first pigment may include a material that is different from the second pigment.

The second printing layer may be fully overlapped by the logo pattern when viewed in a plane.

The first printing layer may include a multilayer structure.

According to one or more embodiments, a window substrate includes a base substrate including a display area and a non-display area, a first printing layer at the base substrate, corresponding to the non-display area, and defining a logo hole defined therein, a logo pattern at the first printing layer, corresponding to the non-display area, and including a portion exposed on the base substrate through the logo hole, and a second printing layer at the logo pattern such that the logo pattern is between the first and second printing layers.

The second printing layer may be fully overlapped by the logo pattern when viewed in a plane.

The first printing layer may include a multilayer structure.

The logo pattern may include a first logo layer in the logo hole, and a second logo layer between the first and second printing layers.

The first and second logo layers may be connected in an integral structure.

BRIEF DESCRIPTION OF THE DRAWINGS

The accompanying drawings are included to provide a further understanding of the present invention, and are incorporated in, and constitute a part of, this specification. The drawings illustrate embodiments of the present invention and, together with the description, serve to explain aspects of the present invention. In the drawings:

FIG. 2B is a cross-sectional view taken along the line II-II' of FIG. 1;

FIGS. 8A to 8H are views illustrating a method of manufacturing a window substrate according to an embodiment of the present invention.

DETAILED DESCRIPTION

Figure 1:
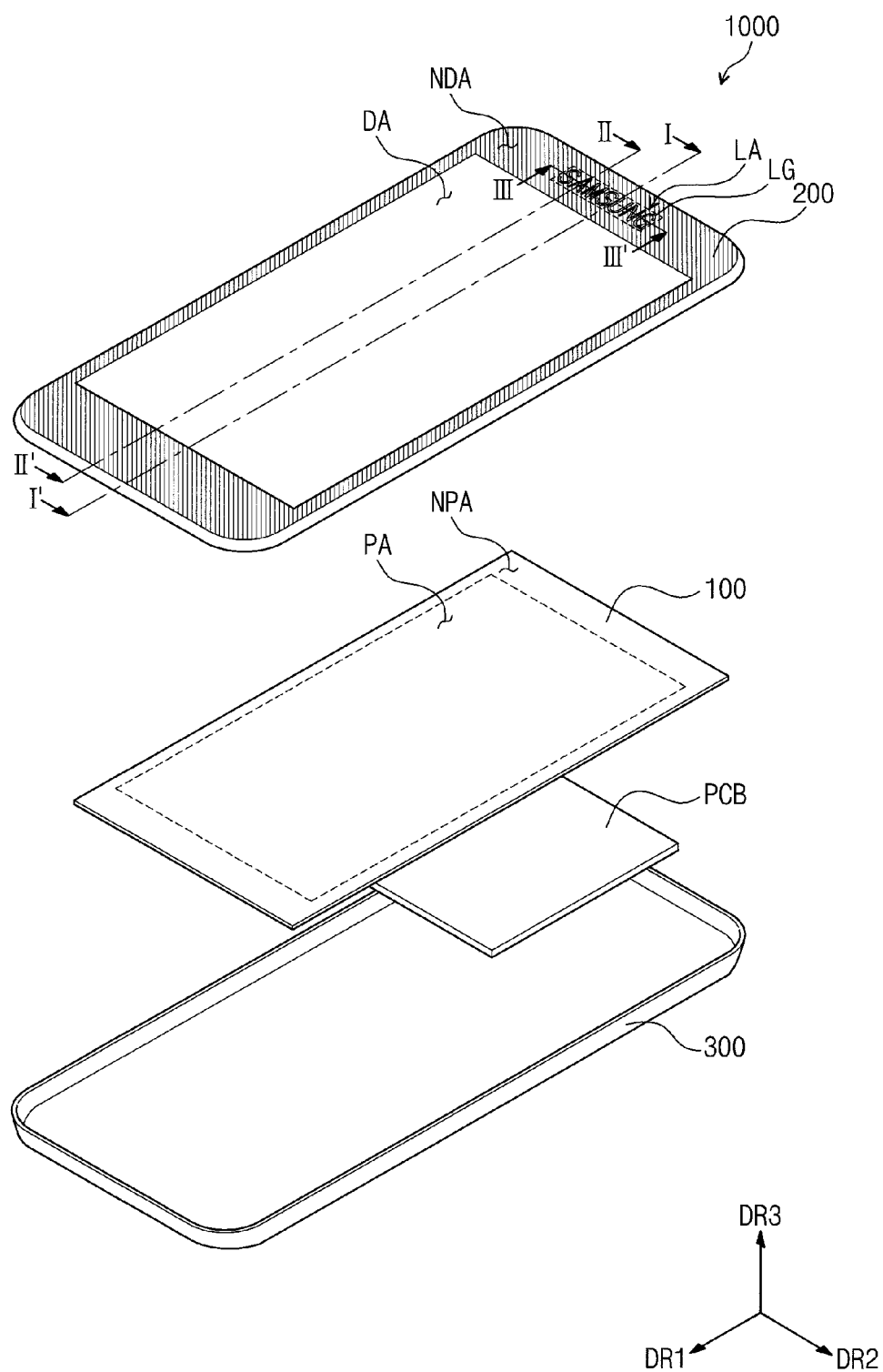
FIG. 1 is an exploded perspective view illustrating a display apparatus according to an embodiment of the present invention.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, preferred embodiments of the present invention will be described in detail with reference to the accompanying drawings.

Figure 2A:
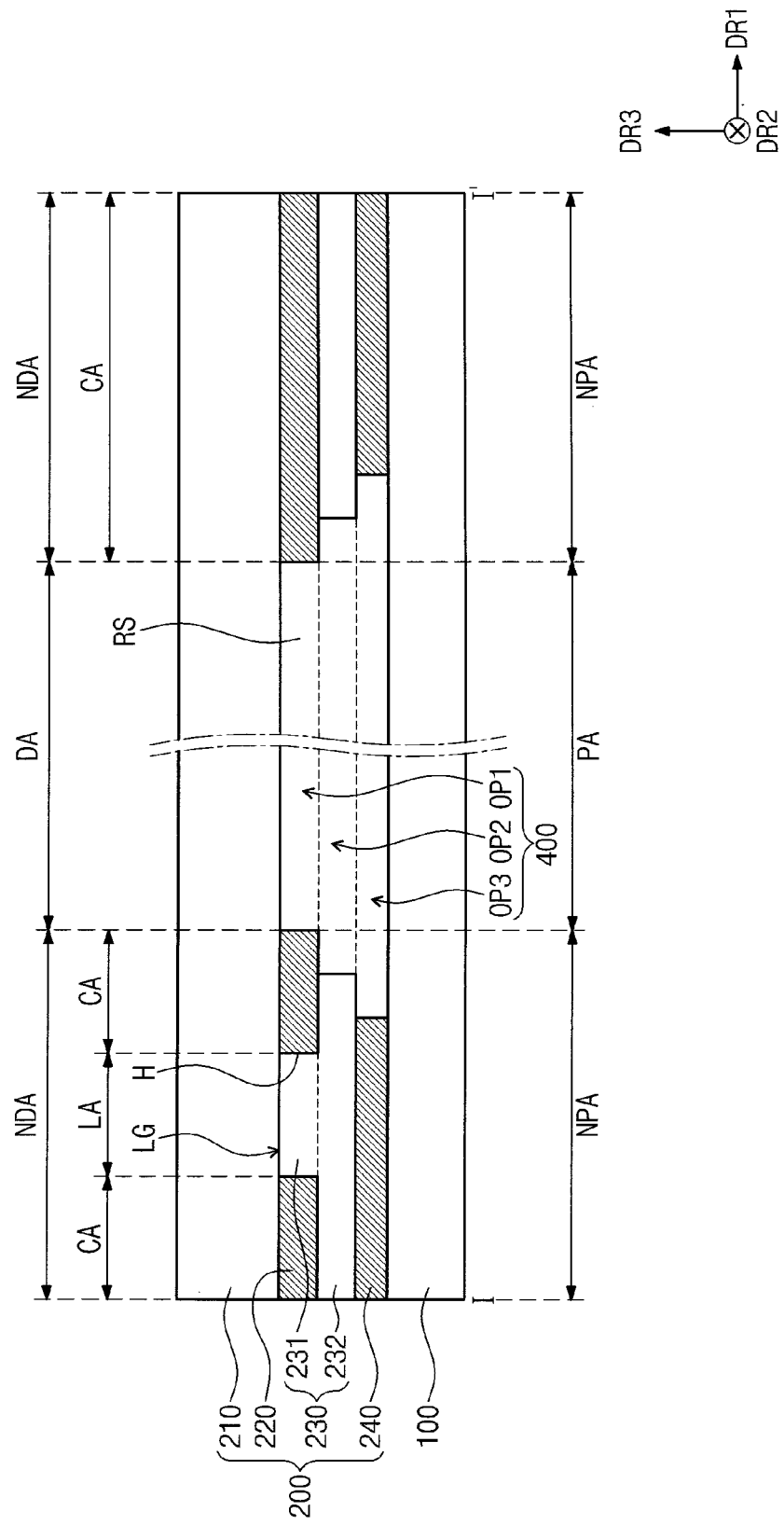
FIG. 2A is a cross-sectional view taken along the line I-I' of FIG. 1.

FIG. 1 is an exploded perspective view illustrating a display apparatus according to an embodiment of the present invention, and FIG. 2A is a cross-sectional view taken along the line I-I' of FIG. 1.

In FIG. 1, a display apparatus 1000 applied to a mobile phone is illustrated as an embodiment of the present invention. However, the display apparatus according to other embodiments of the present invention may be applied to a variety of information-providing apparatuses, such as, for example, a television set, a navigation unit, a computer, a monitor, a game machine, and the like for displaying an image.

Referring to FIGS. 1 and 2A, a display apparatus 1000 according to an embodiment of the present invention may include a display panel 100, a window substrate 200, and a housing member 300 for housing the display panel 100.

The display panel 100 may display an image. The display panel 100 may be a liquid crystal display panel. However, the present invention is not limited to the particular kind of the display panel 100. As a non-limiting example, the display panel 100 may be another type of display panel, such as an organic electro luminescence display panel, an electrowetting display panel, a nano-crystal display panel, or the like.

The display panel 100, when viewed in a plane, may include a pixel area PA and a non-pixel area NPA. The display panel 100 may express an image through the pixel area PA. The non-display area NPA of the display panel 100 may be defined as an area in which the image is not able to be displayed. The non-display area NPA may surround the pixel area PA. The display panel 100 may include a plurality of pixels in the pixel area PA. Also, the display panel 100 may include a driver unit, which is for driving pixels, in the non-pixel area NPA. The pixels may generate an image (e.g., a predetermined image) by being driven by the driver unit.

The window substrate 200 may be located at the display panel 100 to cover the display panel 100. The widow substrate 200 may be coupled to the display panel 100. The window substrate 200 will be described more in detail below.

The housing member 300 may house the display panel 100. In FIG. 1 illustrates that the housing member made of one member, but the present invention is not limited thereto. As a non-limiting example, the housing member 300 may be made of two or more coupled members.

The housing member 300 may further house a printed circuit board (PCB) on which a plurality of active elements and/or a plurality of passive elements may be mounted. Also, according to the type of the display apparatus 1000, the housing member 300 may further house a power supply unit, such as a battery or the like.

Figure 3:
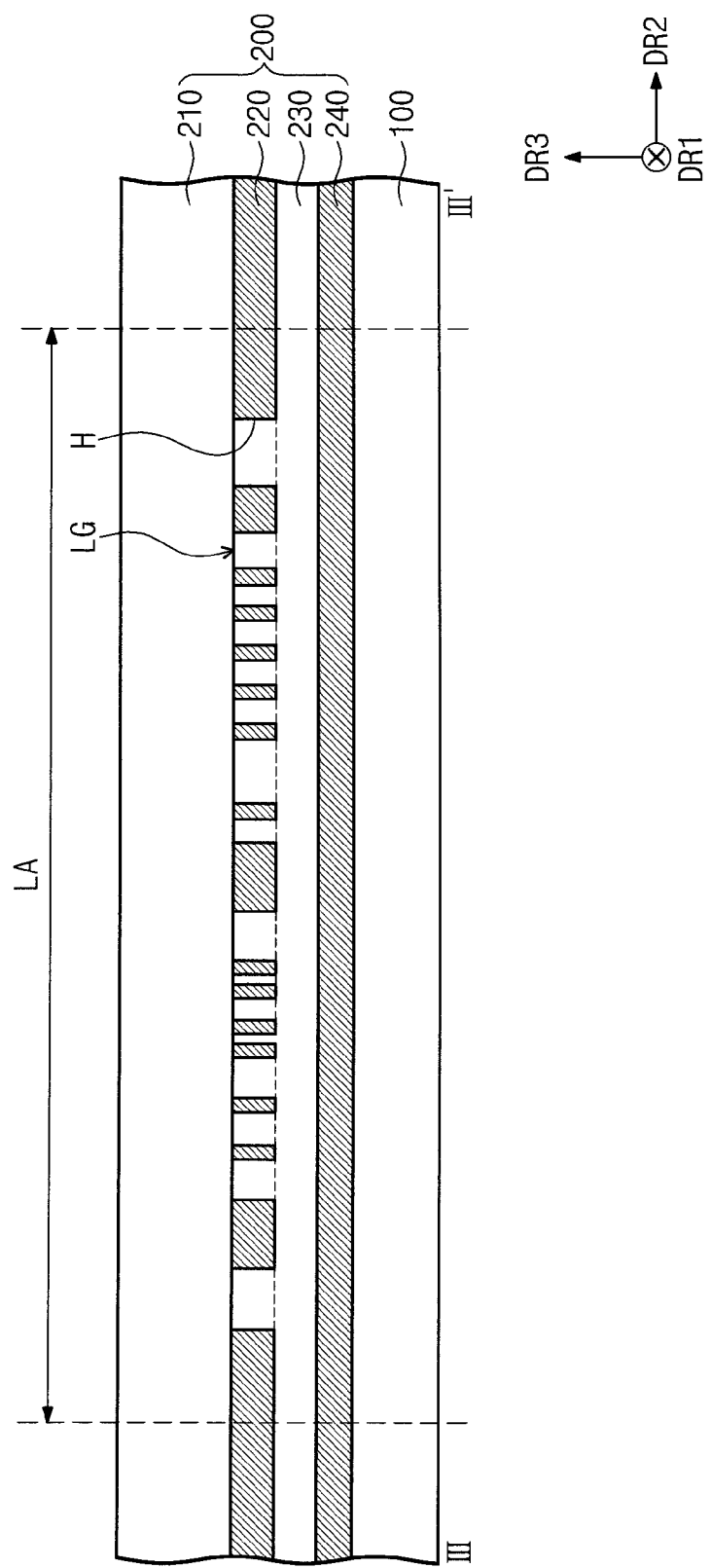
FIG. 3 is a cross-sectional view taken along the line of FIG. 1.

FIG. 3 is a cross-sectional view taken along the line III-III' of FIG. 1.

Referring to FIGS. 1 to 3, the window substrate 200 includes a base substrate 210, a first printing layer 220, a logo pattern 230, and a second printing layer 240.

The base substrate 210 may have a transparent property, such that light may be transmitted therethrough. As a non-limiting example, the base substrate 210 may be a glass.

A display area DA and a non-display area NDA may be defined on the base substrate 210. The display area DA may overlap the pixel area PA of the display panel 100, and the non-display area NDA may overlap the non-pixel area NPA of the display panel 100. Thus, light emitted from the display panel 100 may be transmitted through the display area DA, and an image may thus be displayed in the display area DA.

The non-display area NDA may be adjacent an outer area of the display area DA. The first printing layer 220, the logo pattern 230, and the second printing layer 240 may be in the non-display area NDA of the base substrate 210. Thus, unlike the display area DA, because the light output from the display panel 100 is blocked by the first printing area 220, the logo pattern 230, and the second printing layer 240, the image may not displayed at the non-display area NDA.

As shown in FIG. 2A, the non-display area NDA may include a logo area LA and a light-blocking area CA.

The logo area LA may be defined as an area in which a logo LG is displayed. According to an embodiment of the present invention, the logo LG may include a product name of the display apparatus 1000, a manufacturer's name, or may include a pattern, a letter, or a picture for decorating an exterior view of the display apparatus 1000.

Also, the present invention is not limited to the number of the logo area LA (e.g., one logo area LA). As a non-limiting example, a plurality of logo areas LA may be provided in the non-display area NDA.

The light-blocking area CA may be defined as the remaining area of the non-display area NDA (i.e., the area(s) of the non-display area excluding the logo area LA).

FIG. 2B is a cross-sectional view taken along the line II-II' of FIG. 1.

Referring to FIGS. 2A, 2B, and 3, the first printing layer 220 may be located at the base substrate 210 to correspond to the light-blocking area CA. The first printing layer 220 is in contact with the base substrate 210.

At least one logo hole (e.g., logo hole H in FIG. 2A or logo hole H' in FIG. 2B) and a first opening OP1 may be defined at the first printing layer 220. The logo hole H/H' when viewed in a plane may overlap the logo area LA, and the first opening portion OP1 when viewed in a plane may overlap the display area DA.

The logo hole H/H' when viewed in a plane may have various shapes according to the shape of the logo LG. As a non-limiting example, when the logo LG is shaped as the name "SAMSUNG," the logo hole H may be defined on the first printing layer 220 to correspond to each letter of the "SAMSUNG" (SAMSUNG® is a registered trademark of Samsung C&T Corporation, Republic of Korea).

The first printing layer 220 may have a color, (e.g., a predetermined color) to be exposed on, or visible at, the base substrate 210. As a non-limiting example, the first printing layer 220 may be any one of black, grey, or white color.

The first printing layer 220 may include a polymer resin and a first pigment. As a non-limiting example, the composition material of the first printing layer 220 may include about 30% to about 50% of the polymer resin, and about 10% to about 50% of the first pigment, based on a total weight of the composition material of the first printing layer 220.

The first pigment and the polymer resin of the first printing layer 220 may be mixed in the form of a mixture. That is, particles of the first pigment of the first printing layer 220 may be dispersed in the polymer resin of the first printing layer 220.

The polymer resin included in the composition material of the first printing layer 220 may be a thermosetting resin. As a non-limiting example, the polymer resin included in the composition material of the first printing layer 220 may include acrylic, urethane, polyester, or the like.

The color of the first printing layer 220 may be determined according to the kind of the first pigment included in the composition material of the first printing layer 220. As a non-limiting example, when the first printing layer 220 has a black color, the first pigment included in the composition material of the first printing layer 220 may be a carbon black. Also, when the first printing layer 220 has a white color, the first pigment included in the composition material of the first printing layer 220 may include a reflective material.

According to an embodiment of the present invention, the composition material of the first printing layer 220 may further include an additive and a solvent.

The logo pattern 230 corresponding to the entire non-display area NDA may be located at the first printing layer 220. Thus, a portion of the logo pattern 230 may be exposed, or seen, on the base substrate 210 through the logo hole H defined in the logo area LA, and may be displayed as the logo LG on the base substrate 210.

Specifically, the logo pattern 230 may include a first logo layer 231 and a second logo layer 232. The first and second logo layers 231 and 232 may be connected to each other as an integral structure.

The first logo layer 231 may be located at/below the base substrate 210 corresponding to the logo area LA. The first logo layer 231 may be filled in the logo hole H/H' defined by the first printing layer 220. Thus, the first logo layer 231 may contact the base substrate 210. The first logo layer 231 may be displayed as the logo LG on the base substrate 210.

The second logo layer 232 may be located at/below the first printing layer 220 and the first logo layer 231. That is, the second logo layer 232 may be positioned to correspond to an entirety of, or a majority of, the non-display area NDA.

A second opening OP2 may be defined by the second logo layer 232. The second opening OP2 may overlap the display area DA when viewed in a plane. The area when viewed in a plane of the second opening portion OP2 may be larger than or the same as the area when viewed in a plane of the first opening portion OP1.

The logo pattern 230 may include a polymer resin and a second pigment. As a non-limiting example, the composition material of the logo pattern 230 may include about 30% to about 50% of the polymer resin, and about 10% to about 50% of the second pigment, based on a total weight of the composition material of the logo pattern 230.

The second pigment and the polymer resin of the logo pattern 230 may be mixed in the form of a mixture. That is, particles of the second pigment of the logo pattern 230 may be dispersed in the polymer resin of the logo pattern 230.

The polymer resin included in the composition material of the logo pattern 230 may be a thermosetting resin. As a non-limiting example, the polymer resin included in the composition material of the logo pattern 230 may include acrylic, urethane, polyester, or the like.

The second pigment included in the composition material of the logo pattern 230 may include a metal. As a non-limiting example, the second pigment of the logo pattern 230 may include aluminum (Al).

According to an embodiment of the present invention, the composition material of the logo pattern 230 may further include an additive and a solvent.

The second printing layer 240 may be located at/below the logo pattern 230. A third opening OP3 is defined by the second printing layer 240. The third opening OP3 may overlap the display area DA when viewed in a plane. When viewed in a plane, the area of the third opening OP3 may be larger than, or the same as, the area of the second opening OP2. Thus, the second printing layer 240 may be spaced apart from the first printing layer 220 by the second logo layer 232.

The second printing layer 240 may overlap, or may be overlapped by, the first printing layer 220 when viewed in a plane. Thus, a shielding function of the first printing layer 220 may be improved by the second printing layer 240. The composition material of the second printing layer 240 may be the same as the composition material of the first printing layer 220.

A first space 400 may correspond to the collective areas of the first opening OP1, the second opening OP2, and the third opening OP3, which are located between the display panel 100 and the base substrate 210. The first space 400 may be filled with a resin layer RS. The resin layer RS may include a transparent polymer resin.

The resin layer RS may be a photo-curable resin. The resin layer RS may be hardened by light provided towards the base substrate 210 from the outside. As the resin layer RS is hardened, the display panel 100 and the window substrate 200 may be combined together.

A portion of the resin layer RS located adjacent an inner wall of the second printing layer 240 may be covered with the first printing layer 220, and thus light may not reach thereto. Thus, the portion of the photo-curable resin layer RS located adjacent the inner wall of the second printing layer 240 might not be hardened.

Particles of the polymer resin dispersed in the portion of the resin layer RS may permeate the second printing layer 240. The second printing layer 240 may be discolored by the permeating particles of the polymer resin.

Reactivity (e.g., chemical reactivity) of the logo pattern 230 to the unhardened resin layer RS may be smaller than, or less than, the reactivity of each of the first and second printing layers 220 and 240 to the unhardened resin layer RS. The reactivity may be defined as a chemical activation in which a chemical reaction occurs by each of the first and second printing layers 220 and 240 and the logo pattern 230, which are in contact with the unhardened resin layer RS. The reactivity may be proportional to the amount of the particles of the polymer resin permeating each of the first and second printing layers 220 and 240 and the logo pattern 230 from the unhardened resin layer RS.

According to an embodiment of the present invention, each of the first and second printing layers 220 and 240 may include a first pigment, and the logo pattern 230 may include a second pigment that is different from the first pigment particle. A state in which the particles of the first pigment are arranged in each of the first and second printing layers 220 and 240 may be different from a state in which the particles of the second pigment are arranged in the logo pattern 230. For example, the particles of the second pigment may be more densely arranged than the particles of the first pigment.

Thus, a space (e.g., an average distance) between the particles of the first pigment in each of the first and second printing layers 220 and 240 may be larger than the space between the particles of the second pigment in the logo pattern 230.

According to another embodiment of the present invention, each of the first and second printing layers 220 and 240 may include a first pigment, and the logo pattern 230 may include a second pigment that is the same as the first pigment (instead of different).

Also, a content ratio of the first pigment to the polymer resin of each of the first and second printing layers 220 and 240 may be smaller than a content ratio of the second pigment to the polymer resin of the logo pattern 230. A space between the particles of the first pigment in each of the first and second printing layers 220 and 240 may be larger than the space between the particles of the second pigment in the logo pattern 230. Thus, the amount of particles of the polymer resin permeating the space between the particles of the first pigment from the resin layer RS in each of the first and second printing layers 220 and 240 may be more than the amount of the particles of the polymer resin permeating the space between the particles of the second pigment from the resin layer RS in the logo pattern 230.

Unlike the foregoing embodiments of the present invention, when the first and second printing layers 220 are positioned in connection to each other, the particles of the polymer resin permeating the second printing layer 240 may move to the first printing layer 220. That is, a chemical reaction may occur between the second printing layer 240 and the resin layer RS, and thus portions of the first and second printing layers 220 and 240 may be discolored by the chemical reaction. The discolored first printing layer 220 may be seen on/below the base substrate 210. However, according to an embodiment of the present invention, the logo pattern 230 having relatively smaller reactivity to the resin layer RS may be located between the first and second printing layers 220 and 240. As the first printing layer 220 is spaced apart from the second printing layer 240 with the logo pattern 230 therebetween, the polymer particles of the resin layer RS permeating the second printing layer 240 may be prevented from moving to the first printing layer 220. Consequently, according to an embodiment of the present invention, discoloration of the first printing layer 220 may be prevented or reduced, and thus a yield of the window substrate 200 may be improved.

Figure 4:
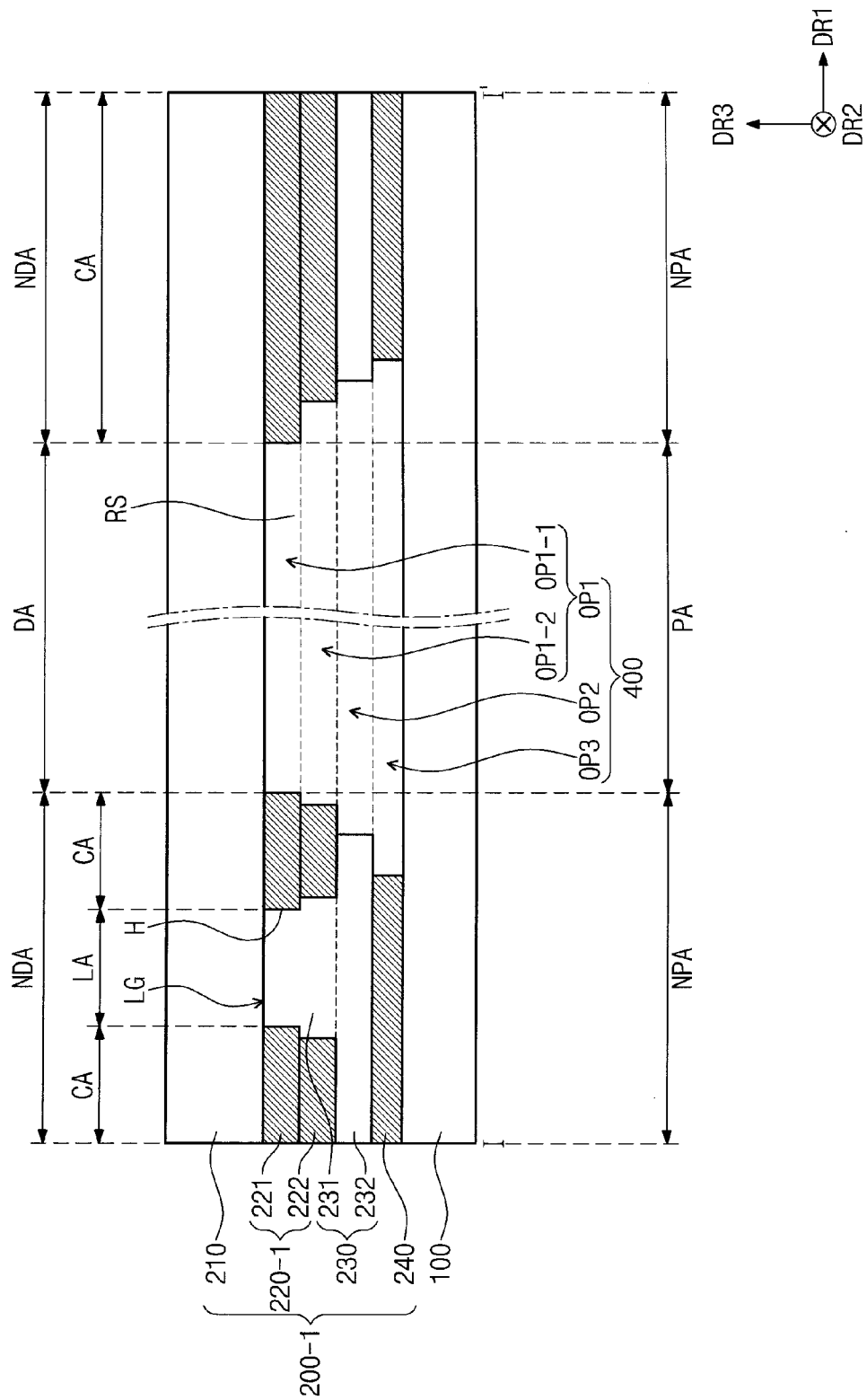
FIG. 4 illustrates a cross-sectional view of a display apparatus according to another embodiment of the present invention.

FIG. 4 is a cross-sectional view illustrating a display apparatus according to another embodiment of the present invention. In describing FIG. 4, the same reference numerals will be given to the same components as those described above, and a duplicate description thereof will be omitted.

Referring to FIG. 4, a first printing layer 220-1 of a window substrate 200-1 according to another embodiment of the present invention may include a plurality of layers. That is, the first printing layer 220-1 is a multilayer structure in which a plurality of layers are laminated. As a non-limiting example, the first printing layer 220-1 may include a plurality of first and second sub-printing layers 221 and 222. The second sub-printing layer 222 may be located at the first sub-printing layer 221.

The second sub-printing layer 222 may be fully overlapped by the first sub-printing layer 221 when viewed in a plane. Specifically, the first opening OP1 may include a first sub-opening OP1-1 and a second sub-opening OP1-2. The first sub-opening OP1-1 may be defined by the first sub-printing layer 221, and the second sub-opening OP1-2 may be defined by the second sub-printing layer 222. When viewed in a plane, the area of the first sub-opening OP1-1 may be smaller than, or the same as, the area of the second sub-opening OP1-2.

A logo pattern 230 may be at the second sub-printing layer 222 fully corresponding to, or within, the non-display area NDA. A second opening OP2 may be defined by the logo pattern 230. The second opening OP2 may overlap the display area DA when viewed in a plane. When viewed in a plane, the area of the second opening OP2 may be larger than, or the same as, the area of the second sub-opening OP1-2.

Figure 5:
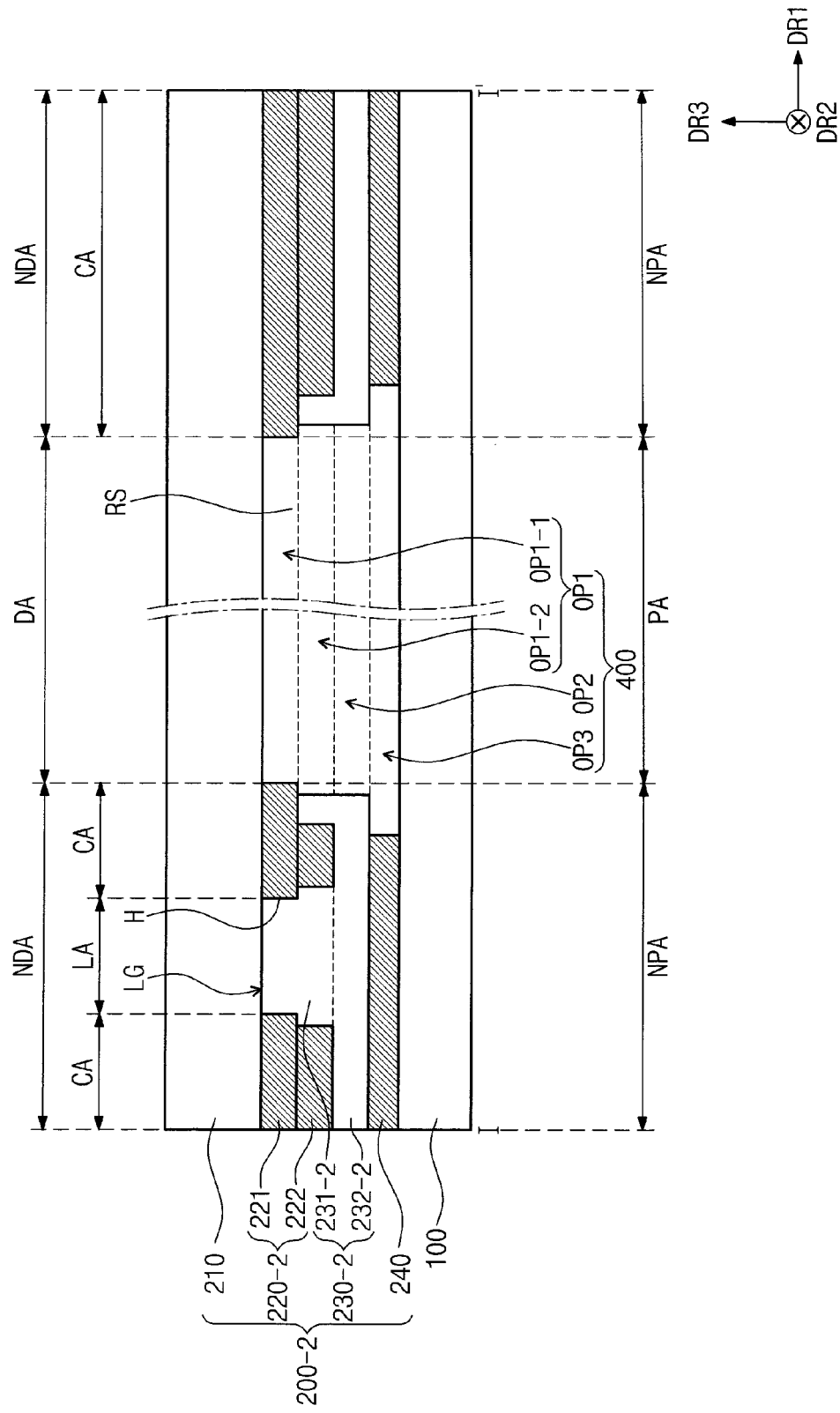
FIG. 5 illustrates a cross-sectional view of a display apparatus according to another embodiment of the present invention.

FIG. 5 is a cross-sectional view illustrating a display apparatus according to another embodiment of the present invention. In describing FIG. 5, the same reference numerals will be given to the same components as those described above, and duplicate description thereof will be omitted.

Referring to FIG. 5, a logo pattern 230-2 of a window substrate 200-2 according to another embodiment of the present invention may be at a second sub-printing layer 222. The logo pattern 230-2 may cover an inner wall, or side wall, of the second sub-printing layer 222, the inner/side wall facing towards the display area DA. Specifically, in the present embodiment, when viewed in a plane, the area of the second sub-opening OP1-2 may be larger than the area of the second opening OP2. Thus, the logo pattern 230-2 may be positioned to cover an inner/side wall of the second sub-printing layer 222.

Figure 6:
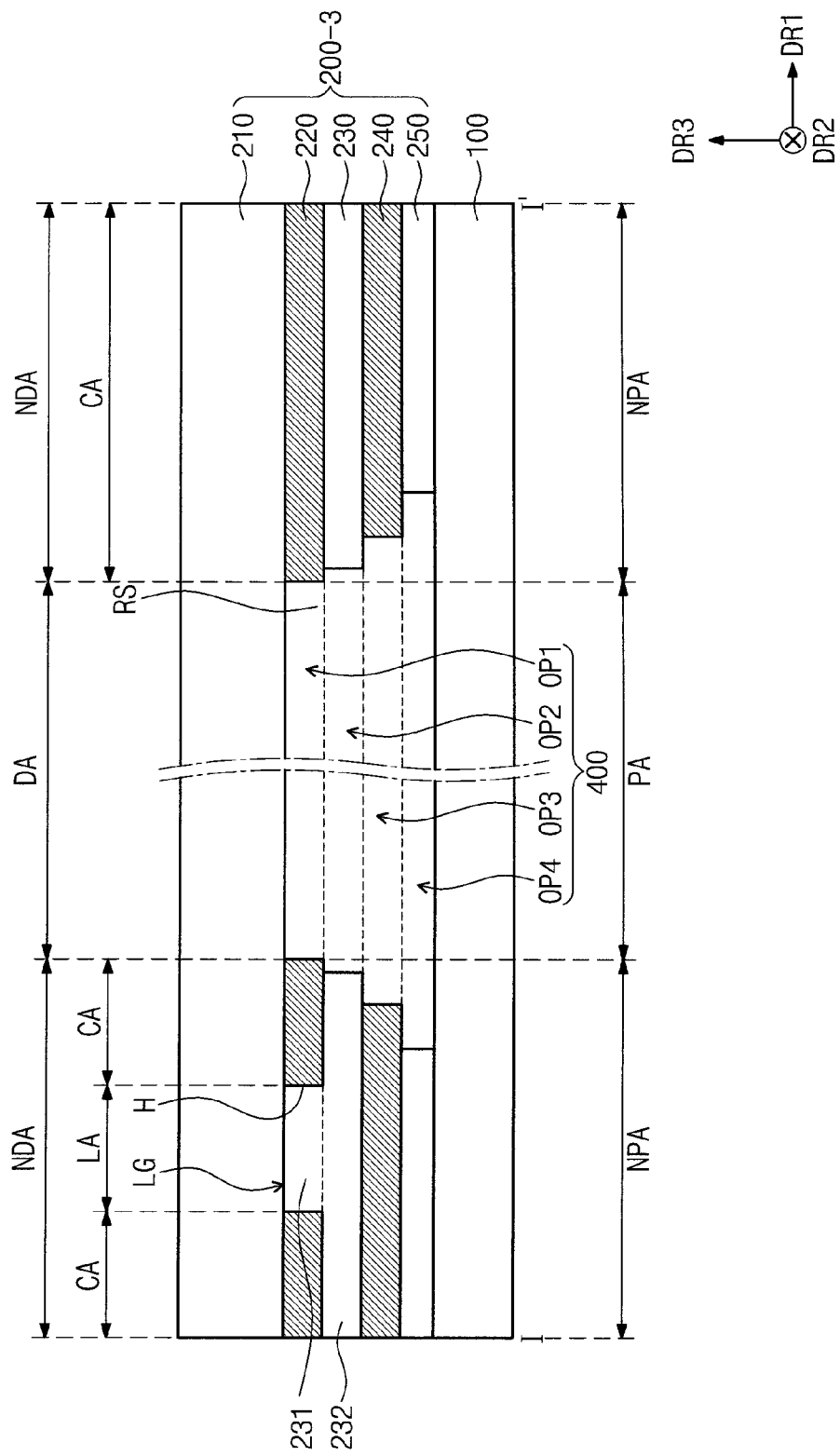
FIG. 6 illustrates a cross-sectional view of a display apparatus according to another embodiment of the present invention.

FIG. 6 is a cross-sectional view illustrating a display apparatus according to another embodiment of the present invention. In describing FIG. 6, the same reference numerals will be given to the same components as those described above, and duplicate description thereof will be omitted.

Referring to FIG. 6, a window substrate 200-3 according to another embodiment of the present invention further includes a third printing layer 250. A third printing layer 250 may be at/below a second printing layer 240. A fourth opening OP4 may be defined by the third printing layer 250. The fourth opening OP4 may overlap the display area DA when viewed in a plane.

The third printing layer 250 may be fully overlapped by the second printing layer 240 when viewed in a plane. Specifically, when viewed in a plane, the area of the fourth opening OP4 may be larger than, or the same as, the area of the third opening OP3.

Figure 7:
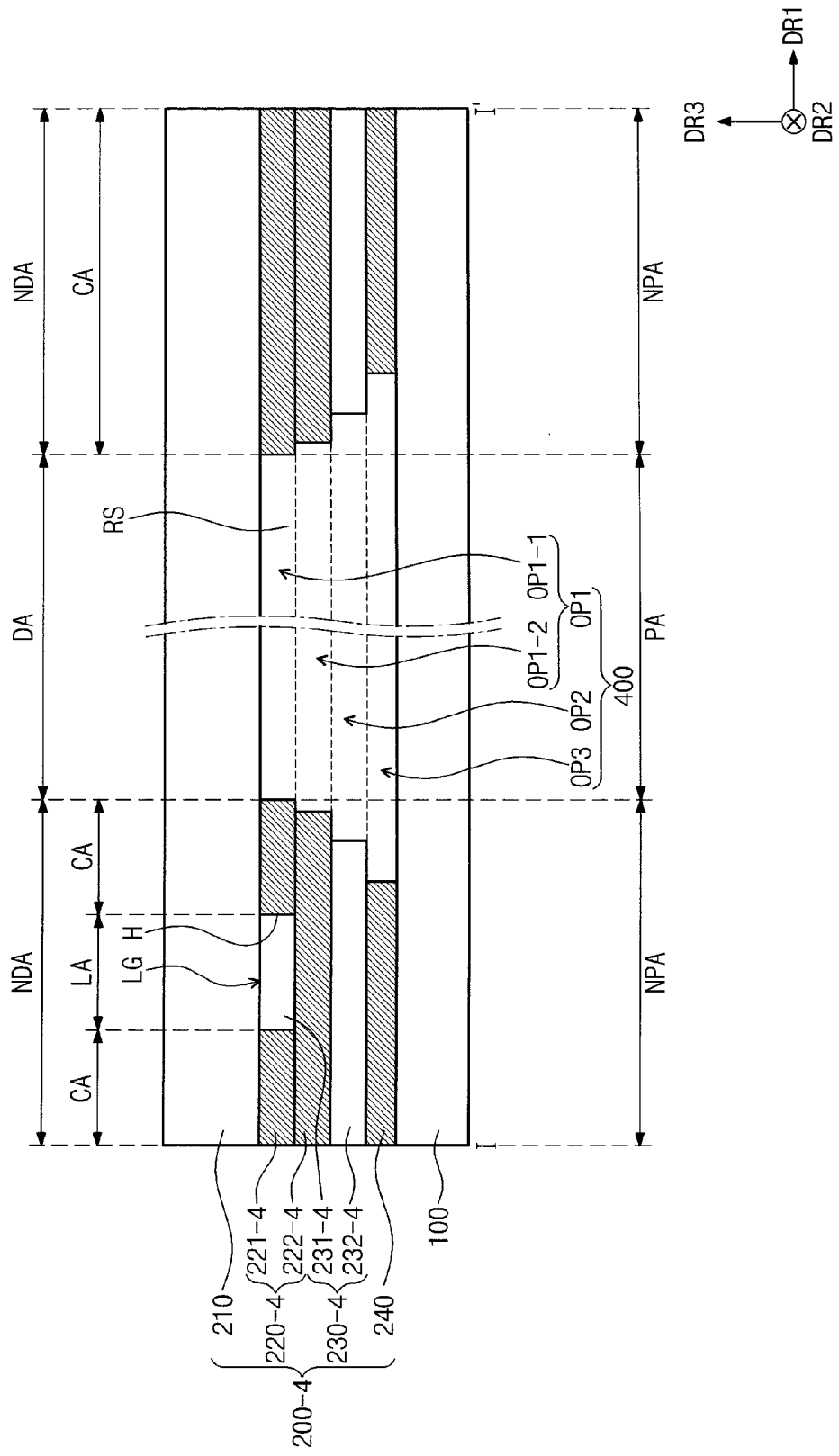
FIG. 7 illustrates a cross-sectional view of a display apparatus according to another embodiment of the present invention.

FIG. 7 is a cross-sectional view illustrating a display apparatus according to another embodiment of the present invention. In describing FIG. 7, the same reference numerals will be given to the same components as those described above, and a duplicate description thereof will be omitted.

Referring to FIG. 7, a first printing layer 220-4 according to another embodiment of the present invention may include a first sub-printing layer 221-4 and a second sub-printing layer 222-4. Also, a logo pattern 230-4 may include a first logo layer 231-4 and a second logo layer 232-4.

The first sub-printing layer 221-4 may be located at/below a base substrate 210 (e.g., areas of the base substrate 210) to correspond to a light shielding area CA. The first sub-printing layer 221-4 may contact the base substrate 210. At least one logo hole H and a first sub-opening OP1-1 may be defined by the first sub-printing layer 221-4.

The first logo layer 231-4 may be at/below the base substrate 210 to correspond to a logo area LA. The first logo layer 231-4 may be filled in the logo hole H defined by the first sub-printing layer 221-4.

The second sub-printing layer 222-4 may be at/below the first sub-printing layer 221-4 and the first logo layer 231-4. A second sub-opening OP1-2 may be defined by the second sub-printing layer 222-4.

When viewed in a plane, the area of the second sub-opening OP1-2 may be larger than, or the same as, the area of the first sub-opening OP1-1. Thus, the second sub-printing layer 222-4 might not be exposed on the base substrate 210 (e.g., may be covered by the first sub-printing layer 221-4 and the first logo layer 231-4).

The second logo layer 232-4 may be at/below the second sub-printing layer 222-4. That is, the second logo layer 232-4 may be spaced apart from the first logo layer 231-4 by the second sub-printing layer 222-4.

A second opening OP2 may be defined by the second logo layer 232-4. The second opening OP2 may overlap the display area DA when viewed in a plane. The second logo layer 232-4 may be fully overlapped by the second sub-printing layer 222-4 when viewed in a plane. Specifically, in the present embodiment, when viewed in a plane, the area of the second opening OP2 may be larger than, or the same as, the area of the second sub-opening OP1-2.

A second printing layer 240 may be at the second logo layer 232-4.

FIGS. 8A to 8H are views illustrating a method for manufacturing a display apparatus according to an embodiment of the present invention. Particularly, FIGS. 8A to 8H area views illustrating a method for manufacturing the display apparatus 1000 illustrated in FIG. 1.

Figure 8A:
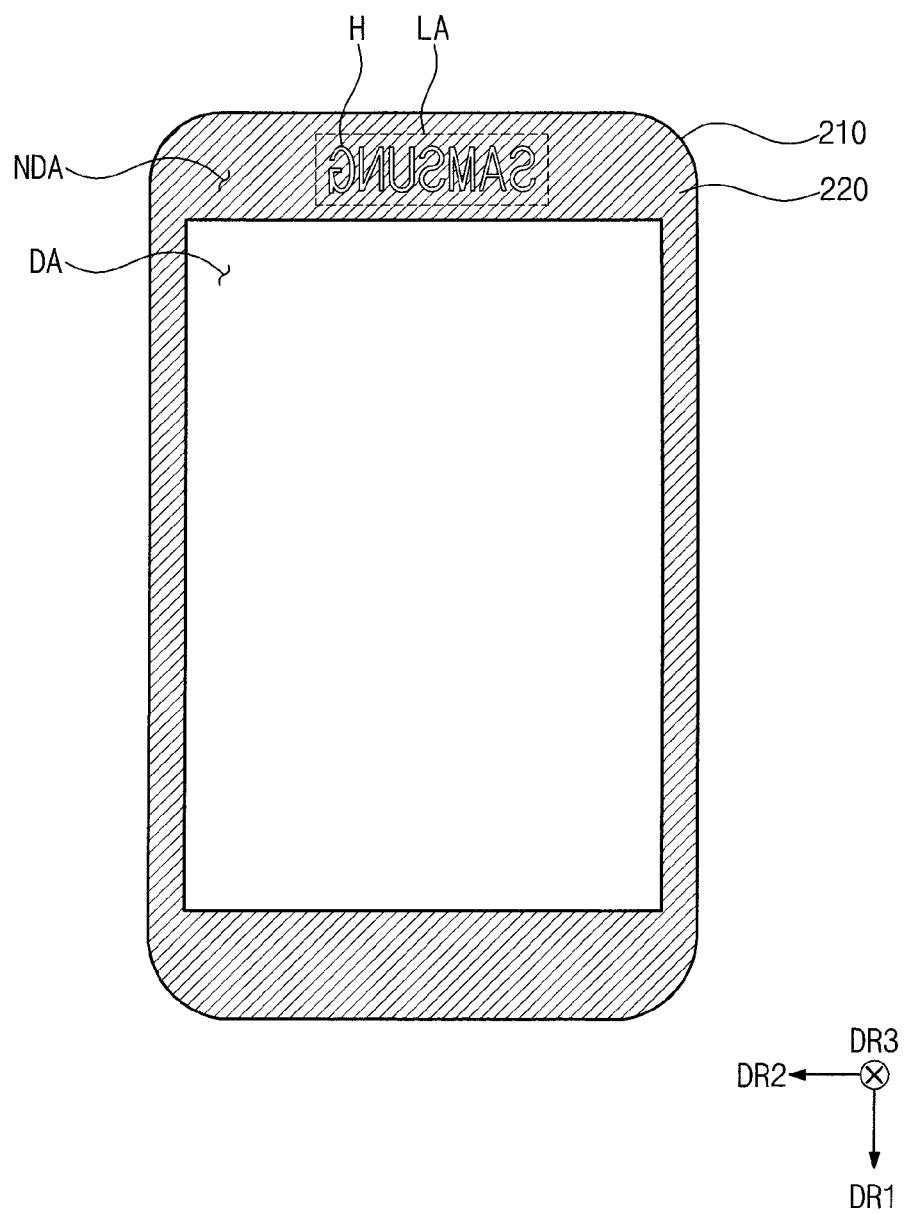
Figure 8B:
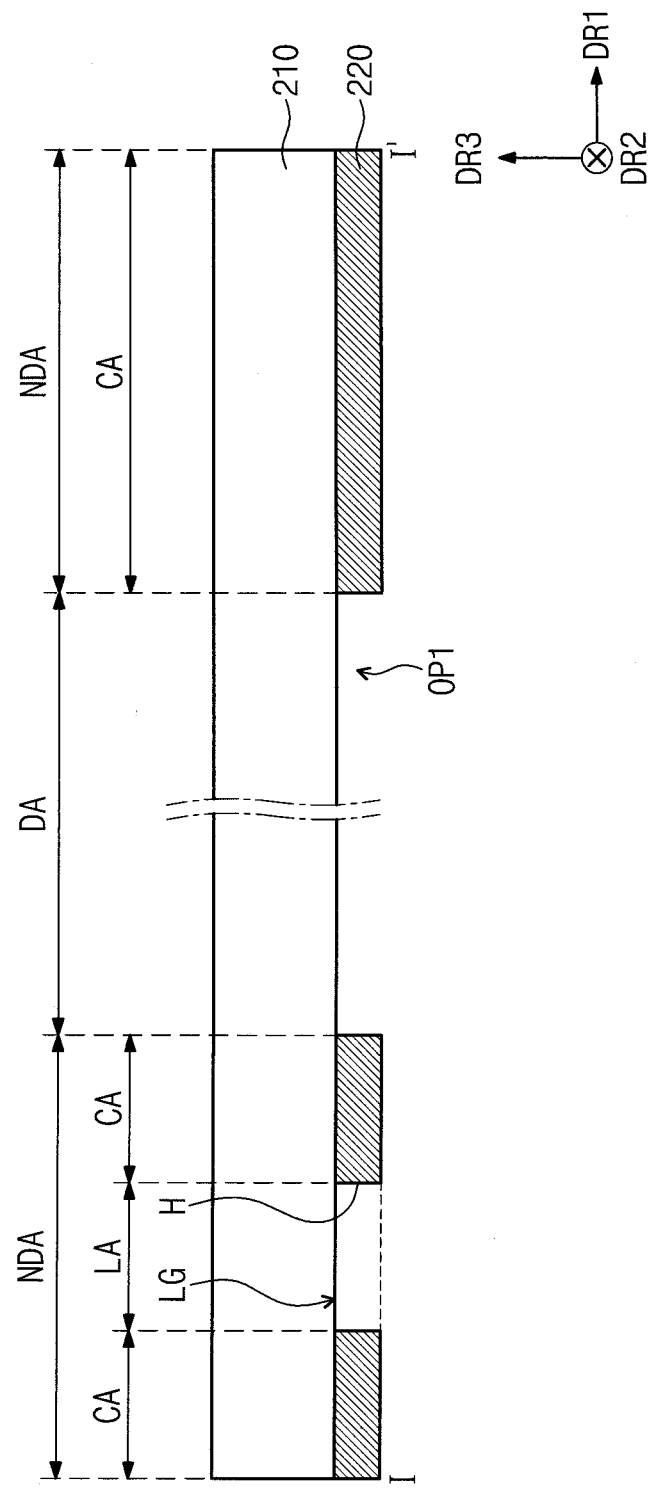

Referring to FIGS. 8A and 8B, a first printing layer 220 may be printed at one surface of a base substrate 210. The first printing layer 220 may correspond to a light shielding area CA. At least one logo hole H and a first opening OP1 may be defined by the first printing layer 220. The logo hole H may overlap a logo area LA when viewed in a plane. The logo hole H may have various shapes according to the shape of a logo LG. The first opening OP1 may overlap a display area DA when viewed in a plane.

Figure 8C:
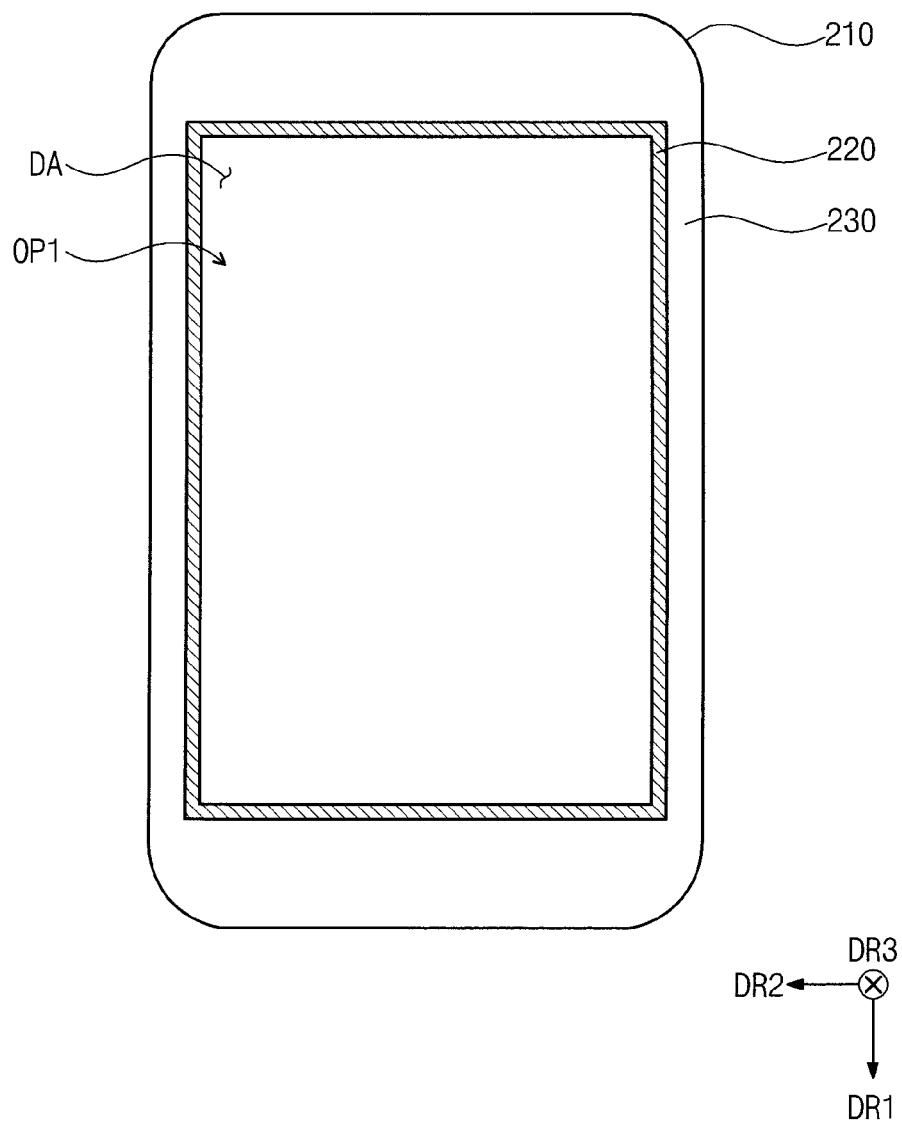
Figure 8D:
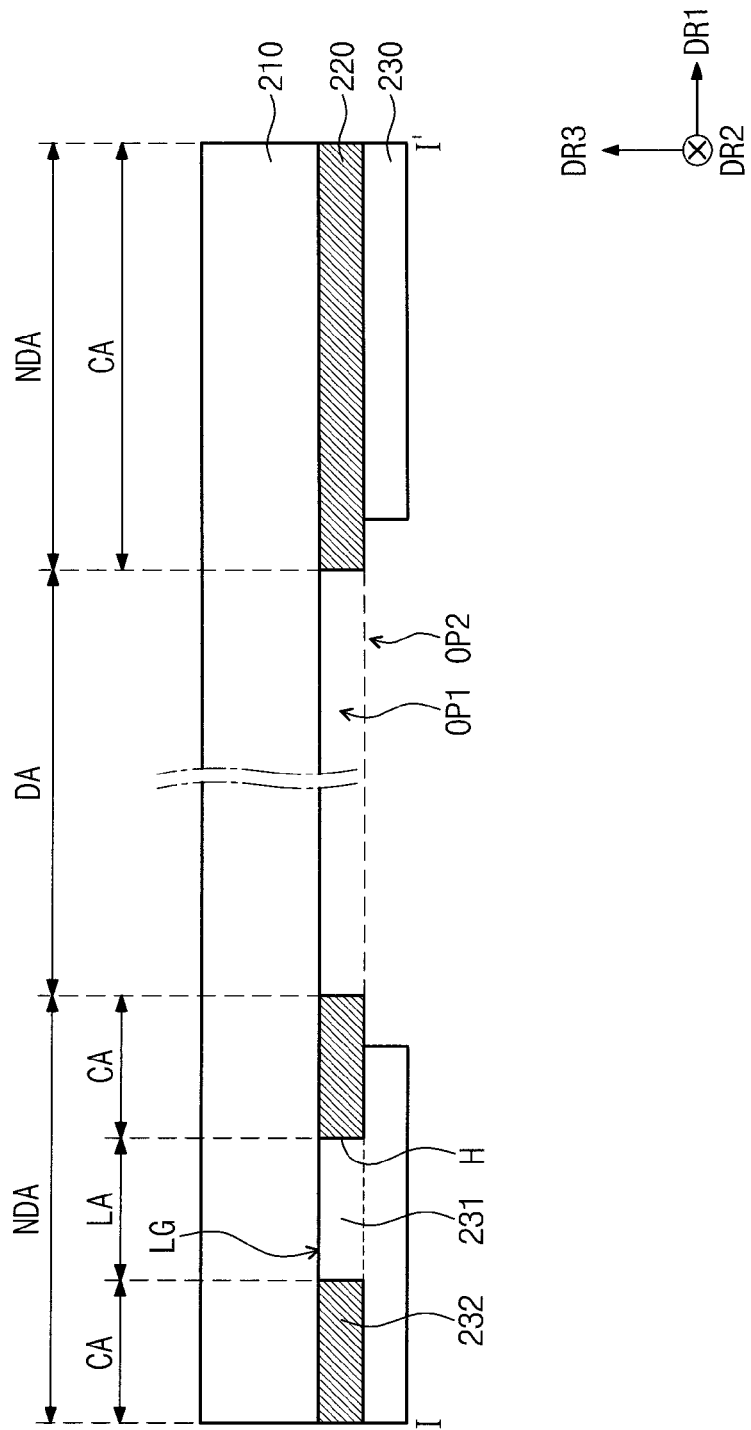

Referring to FIGS. 8C and 8D, a logo pattern 230 is printed on the first printing layer 220. The logo pattern 230 corresponds to, or is located entirely within, the non-display area NDA. A portion of the logo pattern 230 may be exposed on the base substrate 210 through the logo hole H defined in the logo area LA.

A second opening OP2 may be defined by the logo pattern 230. The second opening OP2 may overlap the display area DA when viewed in a plane (e.g., may extend into the non-display area NDA). When viewed in a plane, the area of the second opening OP2 may be larger than, or same as, the area of the first opening OP1.

Figure 8E:
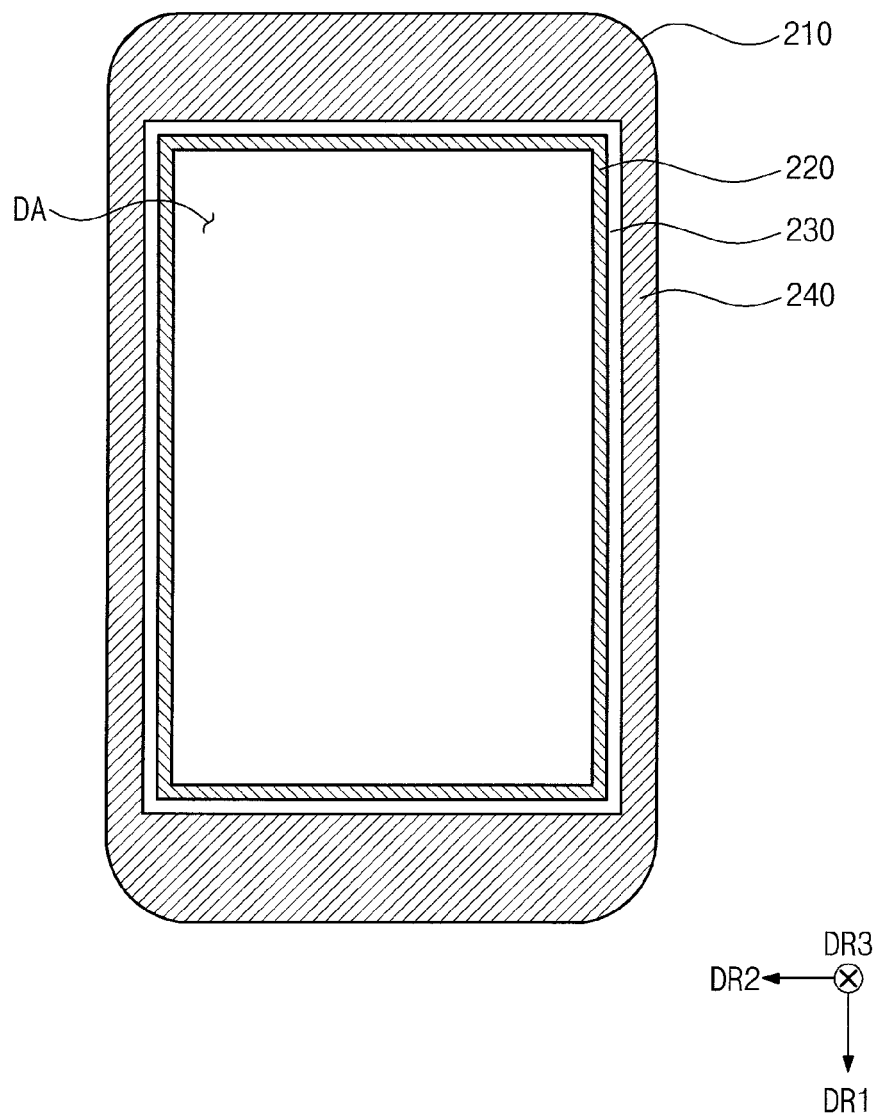
Figure 8F:
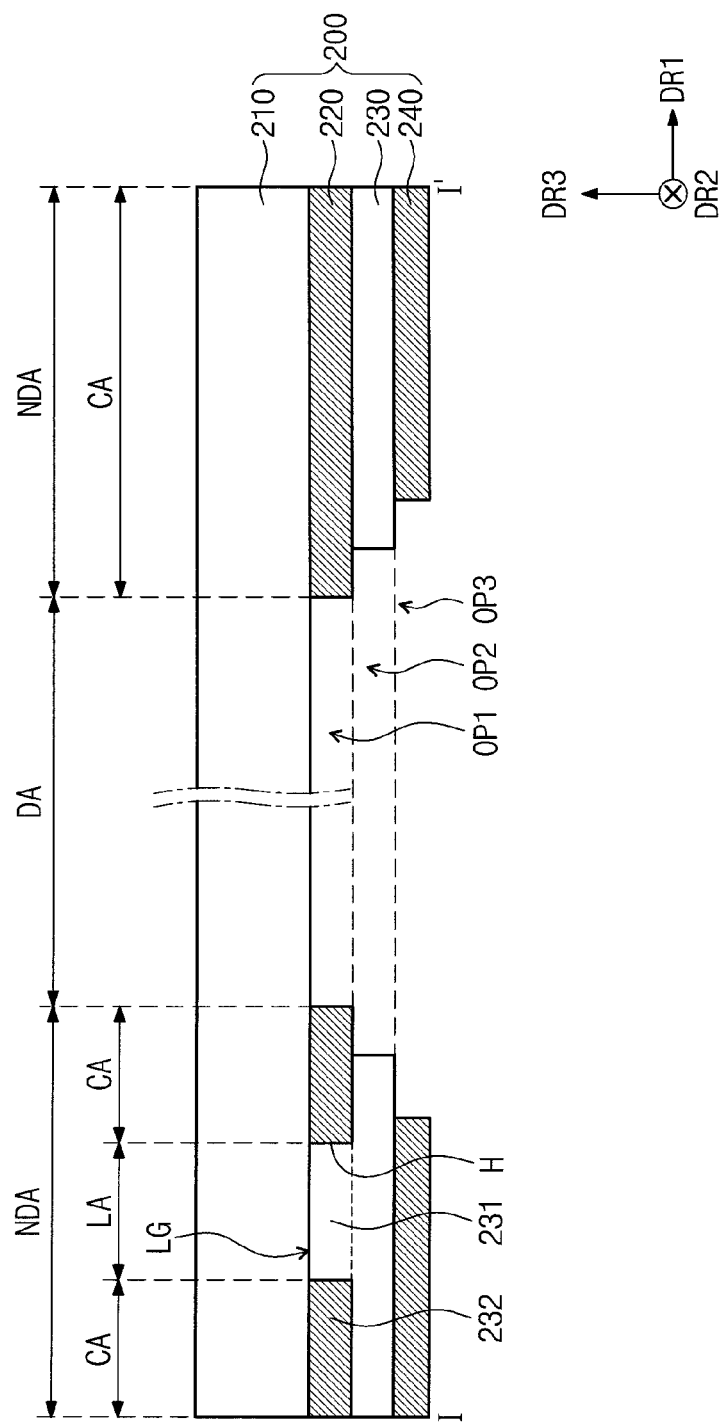

Referring to FIGS. 8E and 8F, a second printing layer 240 may be printed on the logo pattern 230. A third opening OP3 may be defined by the second printing layer 240. The third opening OP3 may overlap the display area DA when viewed in a plane (e.g., may cover the display area DA and extend into the non-display area NDA). When viewed in a plane, the area of the third opening OP3 may be larger than, or the same as, the area of the second opening OP2. Thus, the second printing layer 240 may be spaced apart from the first printing layer 220 by the logo pattern 230. A composition material of the second printing layer 240 may be the same as the composition material of the first printing layer 220.

Figure 8G:
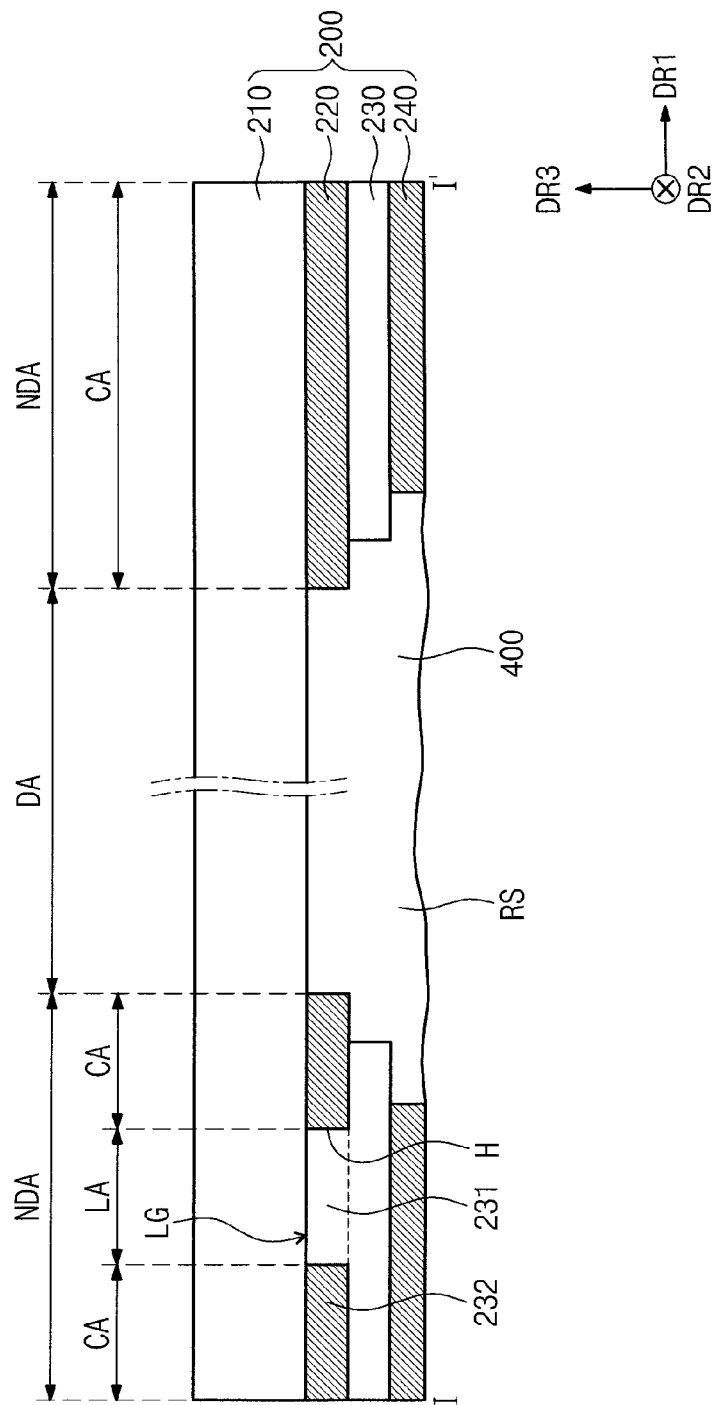

Referring to FIGS. 8F and 8G, a first space 400 (shown in FIG. 8G) in areas of the first, second, and third openings OP1, OP2, and OP3 (shown in FIG. 8F) may be filled with a resin layer RS. The resin layer RS may include a transparent polymer resin.

Referring to FIG. 8H, a window substrate 200 is combined with the display panel 100. The window substrate 200 may be combined with the display panel 100 by the resin layer RS. The resin layer RS may be a photo-curable resin. Thus, the resin layer RS may be hardened by externally supplied light that is provided towards the base substrate 210.

According to the embodiments of the present invention, yields of the window member and the display apparatus including the same may be improved.

While this disclosure has been particularly shown and described with reference to preferred embodiments thereof, it will be understood by those skilled in the art that various changes in form and details may be made therein without departing from the spirit and scope of the present invention as defined by the appended claims. Also, the embodiments disclosed herein should not be construed as limiting the technical idea of the present invention, but all technical ideas within the scope of the appended claims, and an equivalent scope thereof, should be construed as being included in the present invention.

What is claimed is:

1. A display apparatus comprising:
   a display panel for displaying an image; and
   a window substrate covering the display panel, the window substrate comprising:
   a base substrate having a display area and a non-display area;
   a first printing layer at the base substrate, corresponding to the non-display area, and defining a logo hole;
   a logo pattern at the first printing layer and corresponding to the non-display area, a portion of the logo pattern being exposed through the logo hole; and
   a second printing layer at the logo pattern and spaced from the first printing layer with the logo pattern therebetween.

2. The display apparatus of claim 1 further comprising a resin layer between the display panel and the window substrate, and contacting the first printing layer, the second printing layer, and the logo pattern,
   wherein reactivity between the logo pattern and the resin layer is less than reactivity between the resin layer and each of the first and second printing layers.

3. The display apparatus of claim 1, wherein each of the first and second printing layers comprises a first pigment and a polymer resin,
   wherein the logo pattern comprises a second pigment and a polymer resin, and
   wherein a content ratio of the first pigment to the polymer resin in each of the first and second printing layers is smaller than a content ratio of the second pigment to the polymer resin in the logo pattern.

4. The display apparatus of claim 3, wherein the first pigment comprises a material that is different from the second pigment.

5. The display apparatus of claim 4, wherein the second pigment comprises a metallic material.

6. The display apparatus of claim 3, wherein the first printing layer comprises a multilayer structure.

7. The display apparatus of claim 3, wherein the second printing layer is fully overlapped by the logo pattern when viewed in a plane.

8. The display apparatus of claim 3 further comprising a third printing layer at the second printing layer, such that the second printing layer is between the third printing layer and the logo pattern, wherein the third printing layer comprises a same material as the logo pattern.

9. The display apparatus of claim 1, wherein the logo pattern comprises:
a first logo layer in the logo hole and exposed on the base substrate; and
a second logo layer between the first and second printing layers.

10. The display apparatus of claim 9, wherein the first logo layer and the second logo layer comprise an integrally connected structure.

11. The display apparatus of claim 9, wherein the first and second logo layers comprise different shapes, and
wherein the first printing layer is between portions of the first logo layer.

12. The display apparatus of claim 9, wherein the first and second printing layers comprise a first pigment,
wherein the logo pattern comprises a second pigment, and
wherein a content ratio of the first pigment to a remainder of each of the first and second printing layers is smaller than a content ratio of the second pigment to a remainder of the logo pattern.

13. The display apparatus of claim 12, wherein the first pigment comprises a material that is different from the second pigment.

14. The display apparatus of claim 12, wherein the second printing layer is fully overlapped by the logo pattern when viewed in a plane.

15. The display apparatus of claim 12, wherein the first printing layer comprises a multilayer structure.

16. A window substrate comprising:
a base substrate comprising a display area and a non-display area;
a first printing layer at the base substrate, corresponding to the non-display area, and defining a logo hole defined therein;
a logo pattern at the first printing layer, corresponding to the non-display area, and comprising a portion exposed on the base substrate through the logo hole; and
a second printing layer at the logo pattern such that the logo pattern is between the first and second printing layers.

17. The window substrate of claim 16, wherein the second printing layer is fully overlapped by the logo pattern when viewed in a plane.

18. The window substrate of claim 16, wherein the first printing layer comprises a multilayer structure.

19. The window substrate of claim 16, wherein the logo pattern comprises:
a first logo layer in the logo hole; and
a second logo layer between the first and second printing layers.

20. The window substrate of claim 19, wherein the first and second logo layers are connected in an integral structure.

* * * * *